United States Patent
Katikaneni et al.

(10) Patent No.: US 10,790,519 B2
(45) Date of Patent: Sep. 29, 2020

(54) SOLID OXIDE FUEL CELL STACK WITH REDUCED-LEAKAGE UNIT CELLS

(71) Applicant: Saudi Arabian Oil Company, Dhahran (SA)

(72) Inventors: Sai P. Katikaneni, Dhahran (SA); Inyong Kang, Daejeon (KR); Jinwoo Park, Daejeon (KR); Hyundal Song, Daejeon (KR); Hyunbae Park, Daejeon (KR); Byungwook Park, Daejeon (KR)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/000,171

(22) Filed: Jun. 5, 2018

(65) Prior Publication Data

US 2019/0372134 A1  Dec. 5, 2019

(51) Int. Cl.
| | |
|---|---|
| *H01M 8/0273* | (2016.01) |
| *H01M 8/2432* | (2016.01) |
| *H01M 8/0263* | (2016.01) |
| *H01M 8/1213* | (2016.01) |
| *H01M 8/0286* | (2016.01) |
| *H01M 8/1231* | (2016.01) |
| *H01M 8/124* | (2016.01) |

(52) U.S. Cl.
CPC ....... *H01M 8/0273* (2013.01); *H01M 8/0263* (2013.01); *H01M 8/0286* (2013.01); *H01M 8/1213* (2013.01); *H01M 8/1231* (2016.02); *H01M 8/2432* (2016.02); *H01M 2008/1293* (2013.01)

(58) Field of Classification Search
None
See application file for complete search history.

(56) References Cited

U.S. PATENT DOCUMENTS

| | | | |
|---|---|---|---|
| 8,383,282 B2 | 2/2013 | Reinert | |
| 2003/0096147 A1* | 5/2003 | Badding | ............ H01M 8/0271 429/432 |
| 2005/0064268 A1 | 3/2005 | Cho et al. | |

(Continued)

FOREIGN PATENT DOCUMENTS

CA   3032341 A1   2/2018

OTHER PUBLICATIONS

International Search Report and Written Opinion dated Aug. 26, 2019 pertaining to International application No. PCT/US2019/033489 filed May 22, 2019, 15 pgs.

(Continued)

*Primary Examiner* — Zhongqing Wei
(74) *Attorney, Agent, or Firm* — Dinsmore & Shohl LLP

(57) ABSTRACT

Solid oxide fuel cell stacks and methods of sealing a planar solid oxide fuel cell. Unit cells within the stack each include a metal frame with a periphery that can both provide a support surface for a membrane electrode assembly, as well as form a fluid-tight seal with a bonded separator plate. The separator plate includes a peripheral lip that bounds a cell-receiving cavity such that a volumetric region is formed within the separator plate to receive at least a portion of the membrane electrode assembly to create a fluid-tight pathway for at least one of the reactants that is being introduced to a corresponding anode layer or cathode layer of the membrane electrode assembly.

16 Claims, 6 Drawing Sheets

(56) References Cited

U.S. PATENT DOCUMENTS

| | | | |
|---|---|---|---|
| 2006/0068261 A1* | 3/2006 | Bourgeois | H01M 8/0206 |
| | | | 429/456 |
| 2006/0099481 A1* | 5/2006 | Ji | H01M 8/0221 |
| | | | 429/457 |
| 2008/0014492 A1 | 1/2008 | Nielsen et al. | |
| 2008/0248222 A1* | 10/2008 | Ohara | B32B 15/01 |
| | | | 428/34.6 |
| 2009/0130521 A1* | 5/2009 | Fujii | H01M 8/006 |
| | | | 429/454 |
| 2011/0104584 A1 | 5/2011 | Bae et al. | |
| 2011/0223516 A1 | 9/2011 | Ringel et al. | |

OTHER PUBLICATIONS

K. Rissbacher, "Component Technologies for Automotive SOFC", A3PS Conference/Techgae Vienna, Oct. 16, 2009.

Han et al., "Preparation and Characterization of metal supported solid oxide fuel cells with screen-printed electrodes and thin-film electrolyte", Conference: MCARE 2017, Jan. 2017.

\* cited by examiner

SOLID OXIDE FUEL CELL STACK WITH REDUCED-LEAKAGE UNIT CELLS

BACKGROUND

The present disclosure relates generally to a solid oxide fuel cell (SOFC), and more particularly to a stack of SOFC fuel cells where each individual unit includes a metal frame that allows a corresponding membrane electrode assembly (MEA) to be sealingly bonded to an adjacent flow separator plate as a way to reduce reactant leakage.

SUMMARY

A planar SOFC stack is made up of multiple unit cells placed on top of one another where each unit cell includes an anode, a cathode and a solid oxide electrolyte sandwiched together as an MEA. The individual unit cells are physically separated from one another by a separator plate that in addition to providing an electrical connection between two individual unit cells includes passages for receiving reactants in the form of air or fuel. With regard to the reactant flow, neither the fuel nor the air should be mixed with one another prior to the introduction of each reactant to a respective one of the anode or cathode of the MEA, as this may adversely affect the performance of the fuel cell. To prevent such mixing and related leakage, a metal frame with an MEA mounted thereon is bonded to an adjacent separator plate to avoid the use of glass sealants or other materials that have a tendency to crack when subjected to minor vibrations or impact, as well as lower-temperature sealant materials (such as polymer-based ones) that cannot withstand typical SOFC operating temperatures.

According to one embodiment of the present disclosure, an SOFC stack includes numerous unit cells aligned along a stacking dimension or axis. Each of the unit cells includes a metal frame made up of a mounting surface upon which an MEA is secured to form a metal supported cell (MSC), as well as numerous fluidly separate reactant passageways to allow the conveyance of fuel through the MEA anode layer and air through the MEA cathode layer, respectively. Each of the unit cells additionally includes a separator plate that has a peripheral lip that bounds a cavity such that at least the anode layer of the MEA is received within a volumetric region that is defined by the cavity and the peripheral lip. At least a portion of the mounting surface of the metal frame is bonded to the peripheral lip such that a fluid-tight seal is formed between them. Additional components, such as stack upper and lower setter plates may be made cooperative with one another to exert a fixing pressure on the various unit cells along the stacking dimension in order to form the SOFC stack.

According to another embodiment of the present disclosure, a method of sealing a planar SOFC includes arranging a metal frame to have a mounting surface, placing an MEA to fit substantially within an aperture defined by the mounting surface, and connecting a separator plate such that the mounting surface of the metal frame is bonded to a peripheral lip of the separator plate in order to form a fluid-tight seal between them. The separator plate includes a peripheral lip that bounds a cavity such that at least an anode layer of the MEA is received within a volumetric region that is defined by the cavity and the peripheral lip.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

DETAILED DESCRIPTION

Embodiments of the present disclosure are directed to an improved SOFC where a bonded connection allows a fluid-tight seal to be formed between a metal frame-supported MEA and an adjacent-facing separator plate in order to substantially prevent air—such as that from the ambient environment or from the cathode flowpath of the MEA—from mixing with the fuel in the region around the anode layer of the MEA. In this way, air leakage can be minimized, which in turn promotes reduction-oxidation stability of the anode layer of the MEA, which in turn reduces the likelihood of anode layer damage. In particular, the bonded connection uses metal structure that through one or both of similar coefficient of thermal expansion (CTE) or thermo-chemical compatibility achieves a fluid-tight seal that is generally impervious to physical and thermal impact in order to improve long-term stack durability. Furthermore, such bonding may also simplify the manufacturing processes associated with forming the SOFC stack.

Figure 1:
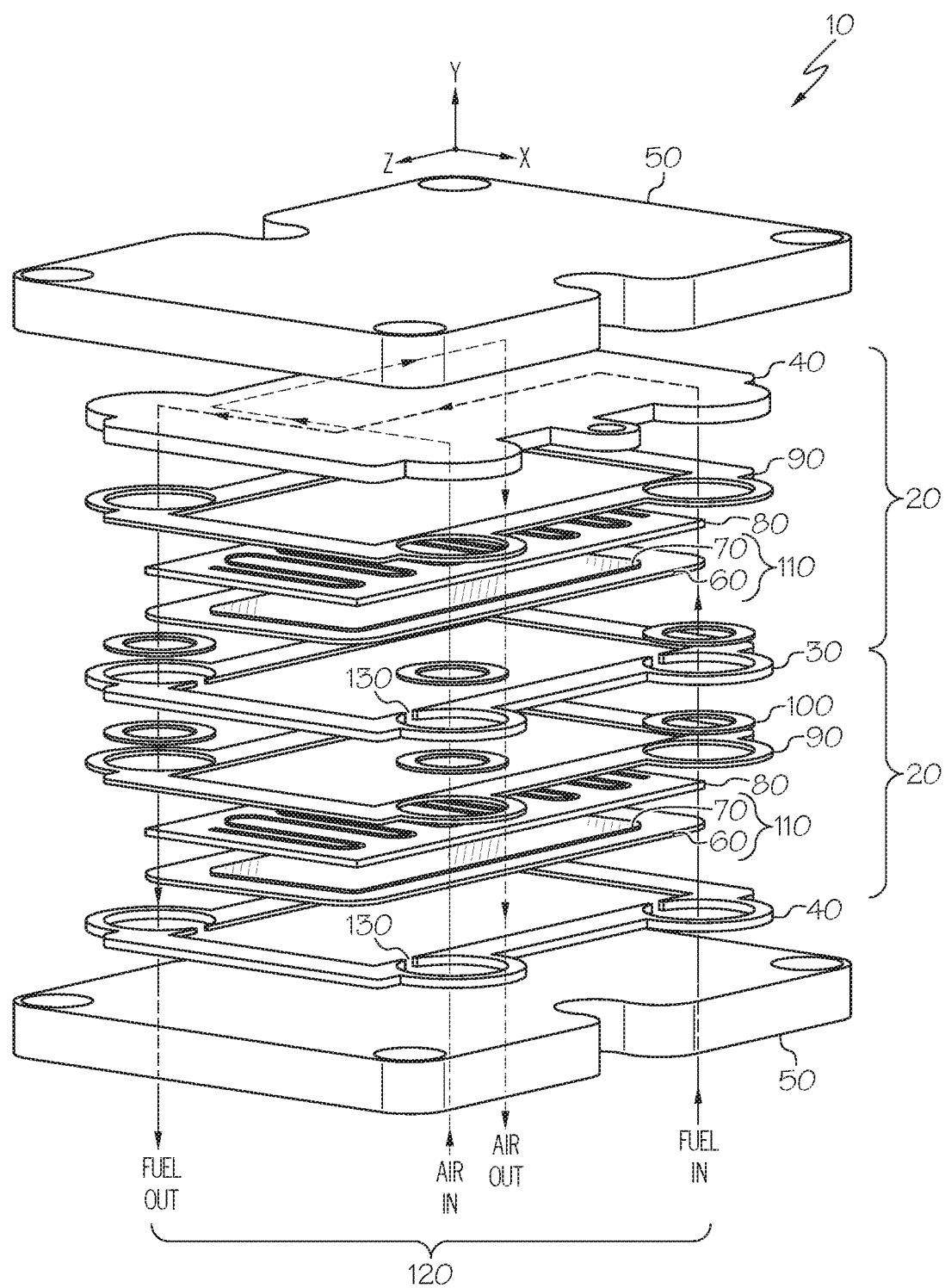
FIG. 1 is an exploded view of a two-cell SOFC in accordance with one or more embodiments of the present disclosure.

Referring first to FIG. 1, an exploded view of an SOFC stack 10 is shown in a notional two-cell plate-type configuration. Accordingly, two unit cells 20 include a substantially planar (that is to say, flat) profile that are stacked on top of one another along a Y-axis (that is to say, vertical) stacking dimension in Cartesian space. Within the present context, reference to a particular stacking, location or dimension direction will be understood to be within the context of the Cartesian coordinates depicted in FIG. 1, and that slight deviations from the same due to minor misalignment relative to such spatial reference system are permissible without any loss in generality. Furthermore, as used within the present disclosure, recourse to a particular component or feature as having upper or lower directional attributes will be understood to be based on the depiction of the Cartesian coordinates of FIG. 1, so that a component exhibiting so-called "upper" attributes will be understood to be father away from the Cartesian axis origin along the positive Y-axis shown than a component exhibiting so-called "lower" attributes. For example, although the SOFC stack 10 is notionally shown as being built up along the vertical Y-axis; it will be appreciated that the SOFC stack 10 may be oriented in any suitable orientation, and that any discussion of Cartesian or other directional attributes associated with such orientation will be similarly attributed to the corresponding surfaces, components or other parts of the SOFC stack 10. Moreover, although the stack 10 is shown as containing two unit cells 20 (as discussed in more detail as follows), it will be appreciated that a greater number of unit cells may be provided, and that all such variants are deemed to be within the scope of the present disclosure.

Each of the first and second unit cells 20 are spaced apart from one another along the stacking dimension of the Y-axis. Additional interspersed components include intermediate separator plate 30, end separator plates 40, stack upper and lower setter plates 50, metal frames 60, MEAs 70, channel plates 80, gaskets 90, gasket rings 100, MSC 110 that is an assembly formed by the joining of a metal frame 60 to a corresponding MEA 70 and reactant passageways 120, all as will be discussed in more detail elsewhere in this disclosure.

It will be appreciated that the electrochemical interactions using fuel as one reactant and air as the other reactant take place in the MEAs 70, and that these interactions in turn provide power in the form of electric current for use by a load, such a motor, auxiliary power unit (APU) or the like. It will likewise be appreciated that the MEAs 70 are shown in FIG. 1 as having a monolayer structure for simplicity, but that in fact are made up of a three-layer structure (such as shown in FIGS. 4B and 4C) with generally planar major surfaces and edgewise minor surfaces where an electrolyte layer 74 is sandwiched between electrodes in the form of an anode layer 72 and a cathode layer 76 such that $O^{2-}$ ions generated at the cathode layer 76 flow through the electrolyte layer 74 and react with the fuel (such as $H_2$ or CO) air at the anode layer 72, while electric current generated by the flow of free electrons produced at the cathode layer 76 from the reduction of oxygen within the air and consumed during the oxidation of the fuel at the anode layer 72 can be used to power one or more external device loads. Within the present context, the terms "major" and "minor"—when used to describe a surface—refer to the amount of surface area rather than the relative importance of such surface to the structure or operation of the SOFC stack 10 in general or one of its components in particular. As such, those surfaces that project a larger surface area (such as the planar surfaces of the anode layer 72 or cathode layer 76 of the MEA 70 that forms a facingly adjacent relationship with either the separator plates 30, 40) is deemed to be a major surface such as that to which other components or features may be mounted, affixed or otherwise secured, while those that project a smaller area (such as those that correspond to the edges that are formed on MEA 70 or metal frame 60) are deemed to be minor surfaces. As such, terms such as "generally planar", "edge" or the like will be understood within the present context to be respectively interchangeable with terms describing such major and minor surfaces.

The remaining components that make up SOFC stack 10 are used to provide mechanical, electrical or fluid-conveying support to the MEAs 70. For example, the immediate structural coupling of each MEA 70 takes place through the metal frame 60 such that when joined to one another they form a substantially unitary structural coupling in the form of the assembled MSC 110. Likewise, the conveyance of reactants to and from each of the MEAs 70 may take place through the aligned reactant passageways 120. In one form, the reactant passageways 120 are defined as an alignable set of apertures that are formed in the respective intermediate separator plate 30, end separator plates 40, gaskets 90 and gasket rings 100 and that will be described in more detail in conjunction with FIGS. 2A, 2B, 2C and 5. In such form, the reactants may be made to flow along the stacking dimension through the passageways 120 such that they act as a vertical manifold. In another form, rather than being formed by the integrated assembly of the various aligned and stacked components, the reactant passageways may be situated outside of the SOFC stack 10, such as in the form of structurally decoupled conduit. It will be appreciated that these and other configurations on the degree of structural integration between the reactant passageways 120 and the remainder of SOFC stack 10 are all deemed to be within the scope of the present disclosure. In the form depicted in FIG. 1, the alignment of these reactant passageways 120 is such that each pair (formed for example by the fluid joining of opposing corner sections into a fluidly-continuous couplet) promotes a fluidly separate way to respectively convey fuel through the anode layer 72 and air through the cathode layer 76 of the MEAs 70. By keeping them fluidly separate, the chances of inadvertent mixing of the different reactants is minimized. In one form, the reactant passageways 120 project predominantly along the stacking dimension in order to convey sufficient quantities of the respective reactant (that is to say, fuel for the anode layer 72 of the MEAs 70 and air for the cathode layer 76 of the MEAs 70). This is depicted notionally by the flowpaths corresponding to "fuel in" and "fuel out", and "air in" and "air out" of FIG. 1. As will be discussed in more detail in conjunction with FIGS. 2C, 4A through 4C and 5, the reactant passageways 120 also include laterally-directed branched gates 130 that allow the diversion of at least some of each of the reactants from the main portion of the passageways 120 to a corresponding one of the anode layer 72 or cathode layer 76 side of each of the MEAs 70. Within the present context, a lateral direction for the flow of a reactant is one that proceeds along the X-axis or Z-axis (or along a plane formed by the X-Z axes) relative to the SOFC stack 10.

As will be discussed in conjunction with FIGS. 2C (for intermediate separator plate 30) and 2D and 4A through 4C (for the end separator plates 40), peripheral lips 34, 44 form upstanding walls that project upwardly from generally planar major surfaces 36, 46 to define trough-like volumetric region 38, 48 with which to accept placement of a major surface of a corresponding MSC 110. This volumetric region 38, 48 is formed as a generally U-shaped receiving cavity in one of the major surfaces 46 (in the end separator plates 40) or both of the major surfaces 36 (in the intermediate separator plates 30). As will be discussed elsewhere in this disclosure, the volumetric regions 38, 48 are where one of the reactants (that is to say, the fuel or air) flow into and out of as part of their interactions with one another to produce electric current in the MEA 70. In one form, the laterally-directed branched gates 130 are formed as relatively small cutouts in one or more of the upstanding peripheral lips 34, 44 of the respective separator plates 30, 40 that bound the volumetric regions 38, 48 in order to allow the lateral introduction of the reactants from the reactant passageways 120 and into the volumetric regions 38, 48. In one form as shown in FIG. 1, these laterally-directed branched gates 130 cause the corresponding reactant to flow in the X-Z plane that is orthogonal to the flow of the reactants through the main part of the reactant passageways 120.

Depending on the diametric size of the flowpath formed by the reactant passageways 120, the gasket rings 100 may be sized to fit within the portion of the passageway 120 that is defined by the apertures 32, 42 or 92 of the corresponding intermediate separator plate 30, end separator plate 40 or gasket 90 such that they may rest upon a lip, ledge or related support structure that may be formed in such apertures 32, 42 or 92. By not having the same lateral cutouts or related breeches in their periphery as the laterally-directed branched gates 130 of the intermediate separator plate 30 or end separator plate 40, the gasket 90 and gasket rings 100 inhibit radially-directed flow out of the corresponding passageway 120 that in turn helps to provide enhanced sealing between the reactant passageways 120 and the adjacent volumetric regions 38, 48 while preserving reactant flow through the stacking dimension of the reactant passageways 120. In addition, the gaskets 90 may define a full-perimeter structure of a size and shape (for example, having the same general rectangular footprint) as the intermediate separator plate 30 or end separator plate 40. In this way, when compressed between adjacently-facing surfaces of one or more stacked intermediate separator plates 30 and end separator plates 40, the gaskets 90 help to further reduce any leakage of reactants, as well as of byproduct fluids and air from the ambient environment. The gaskets 90 may be constructed of a non-conductive compressible material. In one form, the sandwich-like alignment and compliant cooperation between the gaskets 90, gasket rings 100 and the intermediate separator plates 30 and end separator plates 40 can be provided through a compressive clamping force from a bolted connection action of the stack upper and lower setter plates 50. The gasket rings 100 may be fabricated from any of a variety of conventional or yet to be developed materials suitable for use in fuel cell assemblies including, for example, glass, glass-ceramics, alumina-felt, ceramic-ceramic, metal-ceramic, mica, and Thermiculite.

In addition to providing a compliant interface between adjacent components as a way to compensate for manufacturing tolerances by providing a minimum fixed distance between such components, the gaskets 90 may also provide electrical isolation between such components. In fact, maintaining a minimum fixed distance between adjacently facing components helps ensure such electrical isolation, where in one particular form, the minimum fixed distance may prevent the respective separator plates 30, 40 from making electrical contact with one another. Of course, the compressing action produced on the SOFC stack 10 and the gaskets 90 should not be greater than their compression limit in order to avoid excessive or unwanted plastic deformation of the material that makes up the gaskets 90, as such excessive deformation could lead to—among other things—such a loss in electrical isolation.

The construction as shown for the intermediate separator plate 30 may allow it to act as a boundary between the two adjacently-stacked unit cells 20. In such a configuration, the intermediate separator plate 30 may act as a bipolar plate in that the volumetric region 38 can be formed on both opposing side major surfaces 36. Furthermore, each opposing side and companion volumetric region 38 cooperates with a corresponding one of the metal frames 60 and MEAs 70 of the MSCs 110 in order to control the delivery to and removal from the corresponding volumetric region 38 of a first reactant (such as fuel) on one side and a second reactant (such as air) on the other in a manner understood by those skilled in the bipolar plate art. In one form, the intermediate separator plate 30 and the end separator plates 40 are constructed of an electrically conductive material and act as a physical barrier between the unit cells 20, while external circuits may also electrically connect an upper one of the unit cells 20 to a lower one of the unit cells 20 using a suitable series or parallel connection. Similarly-configured volumetric regions 48 of the end separator plates 40 may also be provided on the major surface that is arranged to be facingly adjacent to the corresponding one of the metal frames 60 and inserted MEAs 70 of the MSCs 110.

The channel plates 80 may be placed in a facingly adjacent relationship relative to the cathode layer of the MEAs 70 such that they are disposed between the MEAs 70 and a corresponding one of the intermediate separator plate 30 or end separator plate 40. The channel plates 80 are each positioned adjacent a corresponding surface (such as the anode or cathode surfaces) of one of the MSCs 110. In one form, the channel plates 80 may each include one or more respective serpentine channels as shown to help promote the flow of the air to the cathode layer (which will be discussed in greater detail in conjunction with FIGS. 4B and 4C). Although a serpentine configuration is illustrated in FIG. 1, it should be appreciated that this is merely exemplary in nature, and that other configurations, such as a parallel channel arrangement, are also deemed to be within the scope of the present disclosure. In one form, the channel plates 80 may instead be formed with a porous, foam-like or mesh-like construction in order to promote porosity which in turn facilitates the flow of air from the corresponding reactant passageway 120 to the cathode layer of each MEA 70. In addition, the channel plates 80 may be used in order to establish electrical continuity with an external load or other electrical circuit for the conveyance of electric current from the unit cell 20.

In one form, the SOFC stack 10 may experience relatively high operating temperatures (that is to say, up to about 1000° C.). It should be appreciated that various components of the SOFC stack 10 may undergo thermal expansion when subjected to relatively high operating temperatures, which may result in deformation of one or more of the first and second unit cells 20 and their corresponding supporting components. The upper and lower setter plates 50 may create a fixing pressure upon the unit cells 20 to reduce or substantially eliminate the thermal expansion of the unit cells 20. More specifically, the upper and lower setter plates 50 may each exert a compressive force along the stacking dimension through the use of bolts or other fastening or securing means. The amount of fixing pressure exerted upon the various unit cells 20 may be based on a vertical height the SOFC stack 10 which in turn may depend upon the number of unit cells 20. More specifically, the fixing pressure required to reduce or substantially eliminate the thermal expansion of the SOFC stack 10 may increase as a height of the SOFC stack 10 increases. In other words, increasing the number of unit cells 20 results in a higher fixing pressure required by the SOFC stack 10 to reduce or substantially eliminate the effects of thermal expansion. Similarly, decreasing the number of unit cells 20 results in a lower fixing pressure required by the SOFC stack 10.

Figure 2A:
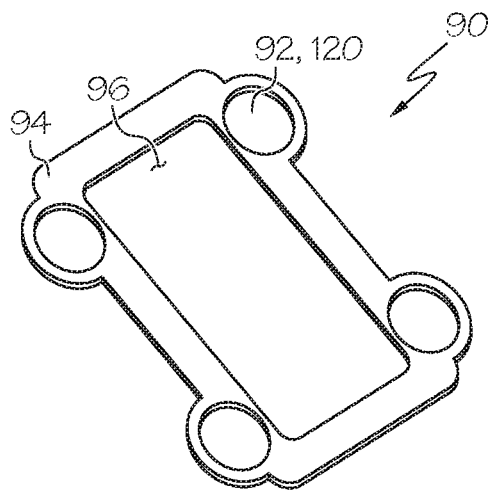
FIG. 2A is an upper perspective view of a gasket as used in the SOFC stack of FIG. 1.
Figure 2B:
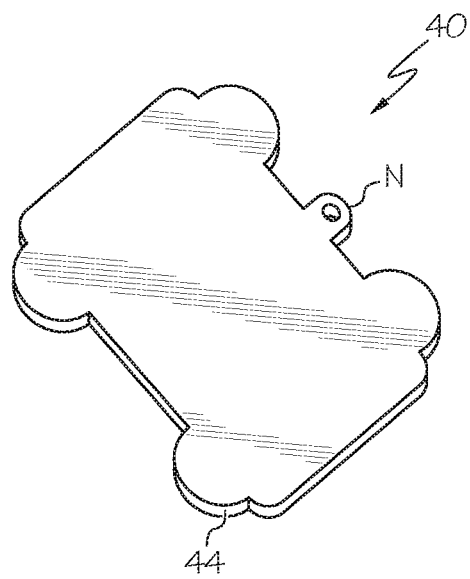
FIG. 2B is an upper perspective view of an upper end separator plate as used in the SOFC stack of FIG. 1.
Figure 2C:
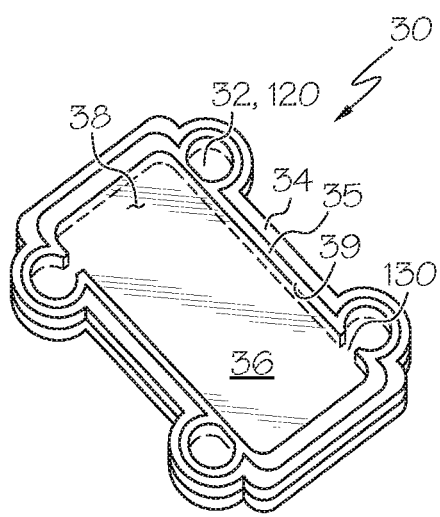
FIG. 2C is an upper perspective view of an intermediate separator plate as used in the SOFC stack of FIG. 1.
Figure 2D:
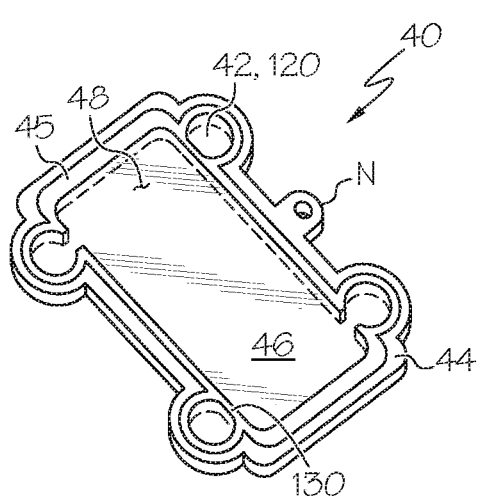
FIG. 2D is an upper perspective view of a lower end separator plate as used in the SOFC stack of FIG. 1.

Referring next to FIGS. 2A through 2D, perspective isolated views of each of the gasket 90 (FIG. 2A), upper end separator plate 40 (FIG. 2B), intermediate separator plate 30 with inserted gasket 90 (FIG. 2C) and lower end separator plate 40 (FIG. 2D) are shown. Referring with particularity to FIG. 2A, a body 94 of the gasket 90 may be shaped to define a central void 96 and a plurality of conduit-like apertures 92 that upon aligned stacking correspond to the reactant passageways 120. In one form, the conduit-like apertures 92 are disposed on each of the four corners of the rectangular-shaped body 94. Referring with particularity to FIG. 2B, the upward-facing major surface of the upper end separator plate 40 defines a generally smooth, planar configuration in order to promote low-profile joining to the adjacent stack upper setter plate 50. The thickness of the upper end separator plate 40 along the stacking dimension can be seen edgewise along the peripheral lip 44. In addition, a notch N may be integrally formed as part of the upper end separator plate 40 to promote aligned stacking of it with the upper setter plate 50 and other components within the SOFC stack 10. In one form, a pin or other alignment securing member may be placed within numerous ones of the aligned notches N that may likewise be formed on various other components such as intermediate separator plate 30, lower end separator plates 40, gaskets 90 or the like. Referring with particularity to FIG. 2C, the intermediate separator plate 30 shows the lateral diversions within part of the apertures 32 and the reactant passageways 120 in the form of the laterally-directed branched gates 130 that allow for the introduction and subsequent removal of at least some of each of the reactants from the main portion of one set of coupled sections of the passageways 120. The recessed, trough-like nature of the volumetric region 38 that is formed as a cavity by the peripheral lip 34 and lower surface 36 can also be seen. Referring with particularity to FIG. 2D, the upward-facing major surface of the lower end separator plate 40 defines a cavity and corresponding volumetric region 48 generally similar in construction to the intermediate separator plate 30 of FIG. 2C through the cooperation of the peripheral lip 44 and lower surface 46 as a way to form cooperative planar surfaces between the lower end separator plate 40 and the MSC 110 as a way to form a fluid-tight seal $S_F$ (as will also be discussed in conjunction with FIGS. 4B and 4C). Similarly, the laterally-directed branched gates 130 act as lateral diversions within part of the apertures 42 to allow for the introduction and subsequent removal of at least some of each of the reactants from the main portion of one set of coupled sections of the passageways 120.

Figure 3:
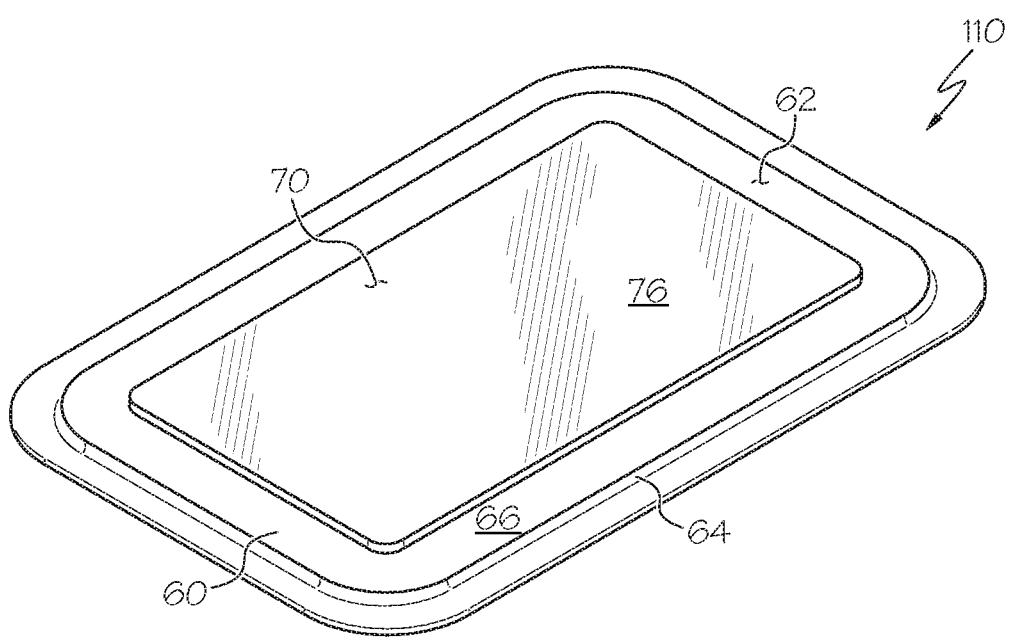
FIG. 3 is an upper perspective view of an MSC as used in the SOFC stack of FIG. 1.

Referring next to FIG. 3, a perspective view is shown of the assembly of the MSC 110 that is formed by the deposition or other placement of the MEAs 70 onto a planar major surface 62 of the metal frame 60 that defines a substantially planar profile. It will be appreciated that the relative thicknesses of the MEA 70 and metal from 60 are not shown to scale, as the edge that corresponds to the minor surface 64 of the metal frame 60 is sometimes on the order of 100 μm to 5000 μm or, more narrowly, 100 μm to 300 μm, while that of the deposited anode, cathode and electrolyte layers is sometimes on the order of 50 μm to 100 μm or, more narrowly, about 200 μm. These dimensions are presented as examples only, for context, and should not be used to limit the scope of the present disclosure or claims. The immediate structural coupling of each MEA 70 takes place through the metal frame 60; when joined to one another, each MEA 70 and corresponding metal frame 60 forms a substantially unitary structural coupling in the form of the assembled MSC 110. Although the MSC 110 is shown as defining a rectangular shape, it should be appreciated that other shapes that form any number of closed polygons (such as a square, rounded rectangles or the like) may also be used, and that all variants are deemed to be within the scope of the present disclosure. In one form, the metal frame 60 is made from a gas-permeable metallic foam (such as those with chromium-rich iron-based alloys) in a manner similar to the foam-based or mesh-based variant of the channel plate 80 to allow for the reactant air ingress to, as well as the egress from, the cathode layer 76. Such porous material or metal foam may be produced by known methods, such as powder metallurgy, where sintering may be used as part of the overall powder metallurgy process to control the amount of such porosity. By using powder metals, the metal frame 60 may avoid some of the durability issues that hamper ceramics. In one form, the cross-sectional surface area of the MEA 70 is such that it fits on a planar major surface 62 that acts like a mounting surface of the metal frame 60 while leaving a peripheral boundary region 66 that extends beyond the surface area footprint defined by the MEA 70 uncovered. Within the present context, components such as the metal frame 60 and channel plate 80 that exhibit porous structure, construction or related properties are those that allow a flow of reactants (such as fuel) in a gaseous form to travel through the thickness of such components in an amount sufficient to allow the MEA 70 to perform is electrical current-generating function in the manner for which it is designed.

Figure 4A:
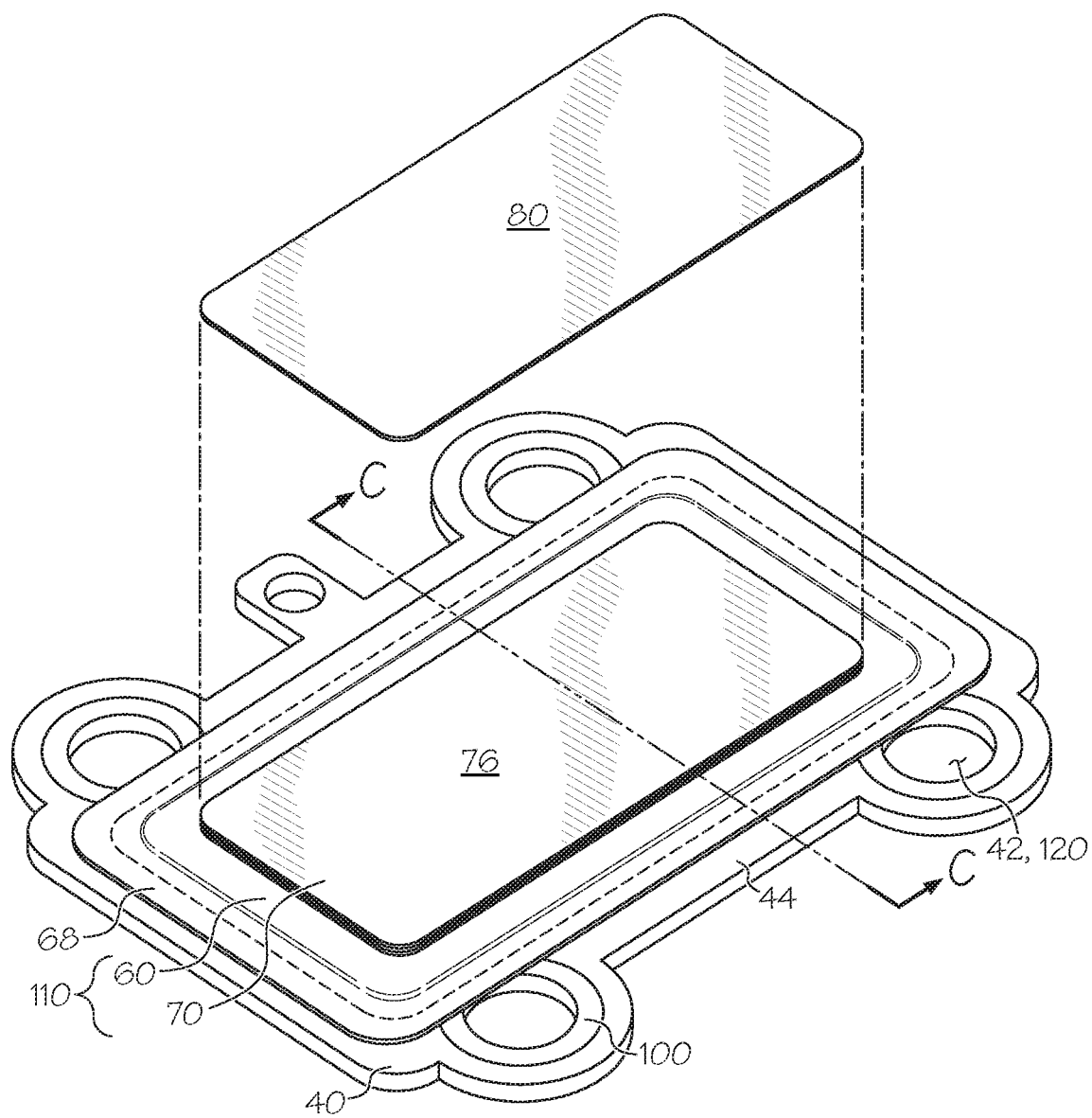
FIG. 4A is an upper perspective view of an assembly made from the MSC of FIG. 3 when bonded to an end separator plate as used in the SOFC stack of FIG. 1.
Figure 4B:
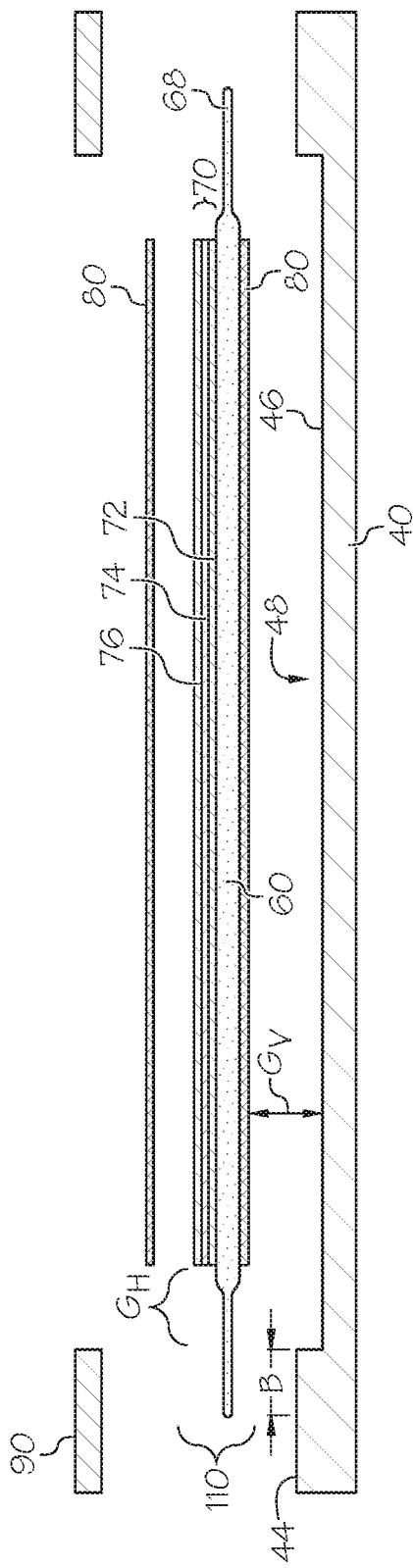
FIG. 4B is a side elevation cutaway view of the MSC and separator plate assembly of FIG. 4A, where the MSC and separator plate are shown in exploded view.
Figure 4C:
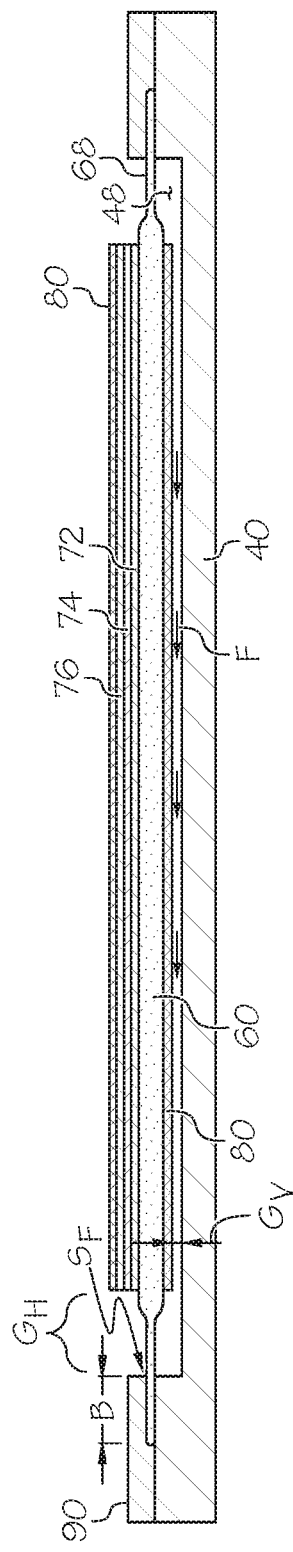
FIG. 4C is a side elevation cutaway view of the MSC and separator plate assembly along a station line C-C of FIG. 4A.

Referring next to FIGS. 4A through 4C, various views showing the cooperation between one of the separator plates 40 and the MSC 110 is shown. Referring with particularity to FIG. 4A (where an optional upper-surface channel plate 80 that may form part of the unit cell 20 of FIGS. 1, 4B and 4C has been shown in exploded view for clarity), placement of the MSC 110 onto the separator plate 40 is such that at least a lower-facing surface of the metal frame 60 (or optional channel plate (not presently shown)) is disposed within the volumetric region 48 of an adjacently-facing lower end separator plate 40. An elevational perspective view shows the stacked and partially nested relationship between the lower end separator plate 40 and the MSC 110, as well as a substantially planar ledge that defines an upper surface of the peripheral lip 44 upon which sealed bonding takes place between the separator plate 40 and a tab 68 that defines at least a portion of the planar major surface 62 of the peripheral boundary region 66 of metal frame 60. Although shown presently with an end separator plate 40 and the MSC 110, and as disclosed elsewhere, the present discussion also applies to the bonding, joining or otherwise affixing of the MSC 110 to one of the intermediate separator plates 30.

Referring with particularity to FIGS. 4B and 4C, details associated with the MSC 110 and the lower end separator plate 40 both in exploded view of FIG. 4B that is prior to bonding, and the as-assembled view of FIG. 4C after the two components have been bonded are shown. The elevational cutaway view shows the various layers of the MEA 70, as well as how the MEA 70 may be secured to an upper surface of the metal frame 60 in order to form the MSC 110. In one form, the metal frame 60 may be made to include the tab 68 by compressing at least a portion of the peripheral boundary region 66 that forms a part of the planar major surface 62. In particular, the porous metal structure of the material making up the metal frame 60 is amenable to such compression along the stacking dimension, thereby allowing the formation of a location where a thin, flat bonding surface B with which to attach to the corresponding upper surface of the peripheral lip 44 of the lower end separator plate 40. In such construction, the tab 66 has a thinner profile along the stacking dimension than the central section that forms the planar major surface 62. As previously mentioned, the MEA 70 includes a three-layer structure where a major surface of the anode layer 72 is placed on one major surface of the electrolyte layer 74, while a major surface of cathode layer 76 is placed on the opposing major surface of the electrolyte layer 74. In one form, the anode layer 72, electrolyte layer 74 and cathode layer 76 are typically made of a porous material in order to promote the relatively free flow of the reactants that are in gaseous form. For example, and not by way of limitation, the electrolyte layer 74 may be made from zirconia-based electrolytes or ceria-based electrolytes. In specific embodiments, the zirconia-based electrolyte layer 74 may be selected from yttria stabilized $ZrO_2$ (YSZ), scandia stabilized $ZrO_2$ (ScSZ), calcia stabilized $ZrO_2$ (CSZ) and combinations thereof. Alternatively, the ceria-based electrolyte layer 74 may comprise rare earth doped ceria. For example, the ceria-based electrolyte layer 74 may be selected from the group consisting of gadolinium doped ceria (GDC), yttria doped ceria (YDC), samarium doped ceria (SmDC) and combinations thereof. Likewise, the cathode layer 76 may be made from any material that exhibits low $O_2$ (g) reduction overpotential at the higher operating temperature range of an SOFC while having negligible interactions with the electrolyte layer 74. For example and not by way of limitation, the cathode layer 76 may be made up of doped lanthanum-based perovskites and related substances, such as lanthanum strontium cobalt ferrite (LSCF), lanthanum strontium manganite (LSM), yttria stabilized $ZrO_2$/lanthanum strontium manganite (YSZ-LSM) and combinations thereof. Furthermore, the anode layer 72 may be made up of ceramic-metallic mixtures (that is to say, cermets) such as those based on metallic nickel with a YSZ skeletal structure. High porosity of the anode layer 72 helps facilitate the relatively free flow of the fuel (when in gaseous form) that is delivered through its respective reactant passageway 120. In one form, the anode layer 72 and cathode layer 76 may be made by screen printing, plasma spraying or the like, while the electrolyte layer 74 may be made by plasma spraying, physical vapor deposition (PVD), sintering, sol-gel, screen printing, wet powder spraying or other known thin-film processes. Additional layers, such as diffusion barrier layers (for example, a cerium-gadolinium oxide (CGO), doped lanthanum-based perovskites or the like) may be used in interfacial regions between the various layers, such as in an electrolyte-to-cathode interface or an anode-to metal substrate layer, where the metal substrate that makes up the metal frame 60 may be in the form of sintered powder or other structure that may be made to have a measure of porosity that could be used to promote reactant permeability. Such diffusion barrier layers may be formed from known techniques, such as PVD or the like.

Regardless of which form of separator plates 30, 40 are employed, the fluid-tight seal $S_F$ formed at the bonding surface B between it and the metal frame 60 extends over at least some—if not all—of the common contact area of their surface widths within the plane formed by the X-Z axes. In one form, such common contact area extends from the peripheral lip 44 of the separator plate 40 to at least a portion of the overlapping outward-extending tabs 68 of the metal frame 60. In one form, the horizontal fluid-tight seal $S_F$ extends around the entire perimeter of the upper surface the peripheral lip 44 of the lower end separator plate 40, and at least along the portion of the stacking dimension within the apertures 42 and accompanying passageways 120 of the respective intermediate separator plate 30 that are not occupied by the laterally-directed branched gates 130.

The volumetric region 48 acts as the previously-discussed trough-like receiving cavity, as well as how a formed reactant flow vertical gap $G_V$ permits the flow of a reactant (specifically, fuel as shown) to encounter the channel plate 80 on its way to the metal frame 60 and then on to the lower-facing major surface of anode layer 72 of the MEA 70. Although the passageways 120 and laterally-directed branched gates 130 that permit the diversion of some of the fuel from the main portion of the passageways 120 are not shown in FIGS. 4B and 4C, it will be understood from recourse to the rest of the present disclosure that the conveyance of fuel—also referred to as fuel flow F—extends horizontally in the reactant flow vertical gap $G_V$ that is formed between a downward-facing major surface of the channel plate 80, the and the upward-facing lower surface 46 of the lower end separator plate 40 after having been introduced through laterally-directed branched gates 130 that permit the diversion of some of the fuel flow F from the main portion of the passageways 120.

The tab 68 that forms the outer perimeter of the metal frame 60 may be bonded to the peripheral lip 44 such that the fluid-tight seal $S_F$ is formed horizontally between them when assembled together. Such bonding may be in the form of a weld, braze, fastened joint, adhesive or the like. The fluid-tight seal $S_F$ substantially prevents the outward leakage into the ambient environment of introduced fuel flow F, and also substantially prevents the inward flow of air from the ambient environment into the anode layer 72 side of the MEA 70. In forms where the adjacently-facing surface of the separator plate 40 is bonded to the metal frame 60 via weld, the material making up the metal frame 60 is substantially resistant to deformation during welding. Likewise, the metal frame 60 and the bonded separator plate 40 may be constructed of the same electrically conductive material such as, for example, a metal or a metal alloy. In one form, the separator plate 40 and bonded metal frame 60 may be constructed of dissimilar electrically conductive materials that both include a similar CTE as a way to help avoid the formation of cracks or other deformities during welding. In a more particular form, the CTE between the separator plate 40 and the metal frame 60 (as well as between the anode layer 72 of the MEA 70 and the metal frame 60) can be tailored in order to be substantially identical, where (for example) the previously-discussed diffusion barrier layers may be used in order to inhibit the interdiffusion of alloy components between adjacent layers.

Although not shown in FIG. 4B, it will be appreciated by those skilled in the art that in situations where the separator plate is configured as an intermediate separator plate 30, there is a substantially mirror-image lower-facing structure such that the intermediate separator plate 30 has bipolar plate features. Likewise, in situations where the separator plate is configured as shown as one or the other of the upper or lower end separator plates 40, no such substantially mirror-image opposing surface structure or related bipolar plate features are needed, and that both construction variants will be both understood from the context and within the scope of the present disclosure. Regardless of whether the separator plate is an intermediate separator plate 30 or one of the end separator plates 40, the nesting nature of the placement of the MSC 110 into the volumetric regions 38, 48 formed within the respective separator plates 30, 40 can be seen. The nested stacking of the MSC 110 and the adjacent one of the separator plates 30, 40 is such that upon being bonded together (such as by welding or the like as discussed previously), the thickness along the stacking dimension is not significantly greater than that of the separator plate 30, 40 alone. As such, in configurations where the SOFC stack 10 is made up of numerous unit cells 20, the vertical height of the SOFC stack 10 can be reduced relative to an arrangement where no such nesting is present, thereby allowing for more unit cells 20 to be packed within a given amount of SOFC stack 10 height; it will be appreciated that such overall thickness reduction of the unit cells 20 is particularly beneficial in transportation-based applications (such as the previously-mentioned APU) where packaging and volumetric constraints are particularly acute. Regardless of the manner in which the metal frame 60 is coupled to the MEA 70 in the MSC 110, the planar major surface 62 may also provide the stiffness required in order to substantially prevent flexing or bowing of the MEA 70.

The MSC 110 is oriented with respect to the lower separator plate 40 such that a substantially porous reactant flow continuum is formed by the exposure of the fuel flow F that is traveling along the upward-facing lower surface 46 of the lower separator plate 40 in the reactant flow vertical gap $G_V$. Such continuum means that the fuel flow F will encounter—in succession—the anode layer 72, planar major surface 62 of the metal frame 60 and optional channel plate 80. In one form, the reactant flow vertical gap $G_V$ is less than about one millimeter in thickness (that is to say, along the stacking dimension). By such sizing, the reactant flow vertical gap $G_V$ allows for the fuel flow F to be generally laminar across the receiving lower-facing major surface of the channel plate 80 and the upward-facing lower surface 46 of the lower end separator plate 40. As such, fuel flow F is made to contact as much of a reactant-facing surface as possible. In one form, a reactant-facing surface is that which first encounters the respective flow of air or fuel. For example, as shown the channel plate 80 projects downwardly from the remainder of the MSC 110 such that it extends into the volumetric region 48 of the separator plate 40 to be the first part being exposed to the fuel flow F. Likewise, in configurations where the channel plate 80 may not be present on the fuel side of the unit cell 20, the anode layer 72 projects downwardly from the remainder of the MSC 110 such that it extends into the volumetric region 48 of the separator plate 40 to be the first part of MEA 70 to be exposed to the fuel flow F.

In addition, a minimum laterally inward distance along the X-axis as shown is between the edges of MEA 70 and the fluid-tight seal $S_F$ so as to provide a thermal barrier horizontal gap $G_H$ that is used to substantially prevent or reduce any thermal shock or related excessive heat transfer that may be experienced by the MEA 70 as the fluid-tight seal $S_F$ is formed. In such a form, the MEA 70 is inwardly spaced from the tab 68 of the metal frame 60 in the plane formed by the X-Z axes to define the thermal barrier horizontal gap $G_H$. For example, if welding is used to create the fluid-tight seal $S_F$, then the thermal barrier horizontal gap $G_H$ helps ensure a low thermal conductivity gas-rich "dead zone" that reduces the edgewise conductance of heat being generated during the welding or other bonding process into the MEA 70. In some embodiments, the thermal barrier horizontal gap $G_H$ may extend laterally inward at least about five millimeters, while the length of the bonding line that makes up the fluid-tight seal $S_F$ is at least about four millimeters, both in the plane formed in the X-Z axes. Thus, in one form, the ratio of the width of the common seating area that includes the bonding line that makes up the fluid-tight seal $S_F$ relative to the thermal barrier horizontal gap $G_H$ is about 0.8, although any lateral width ratio from about 0.5 to about 1.0 is also within the scope of the present disclosure.

Figure 5:
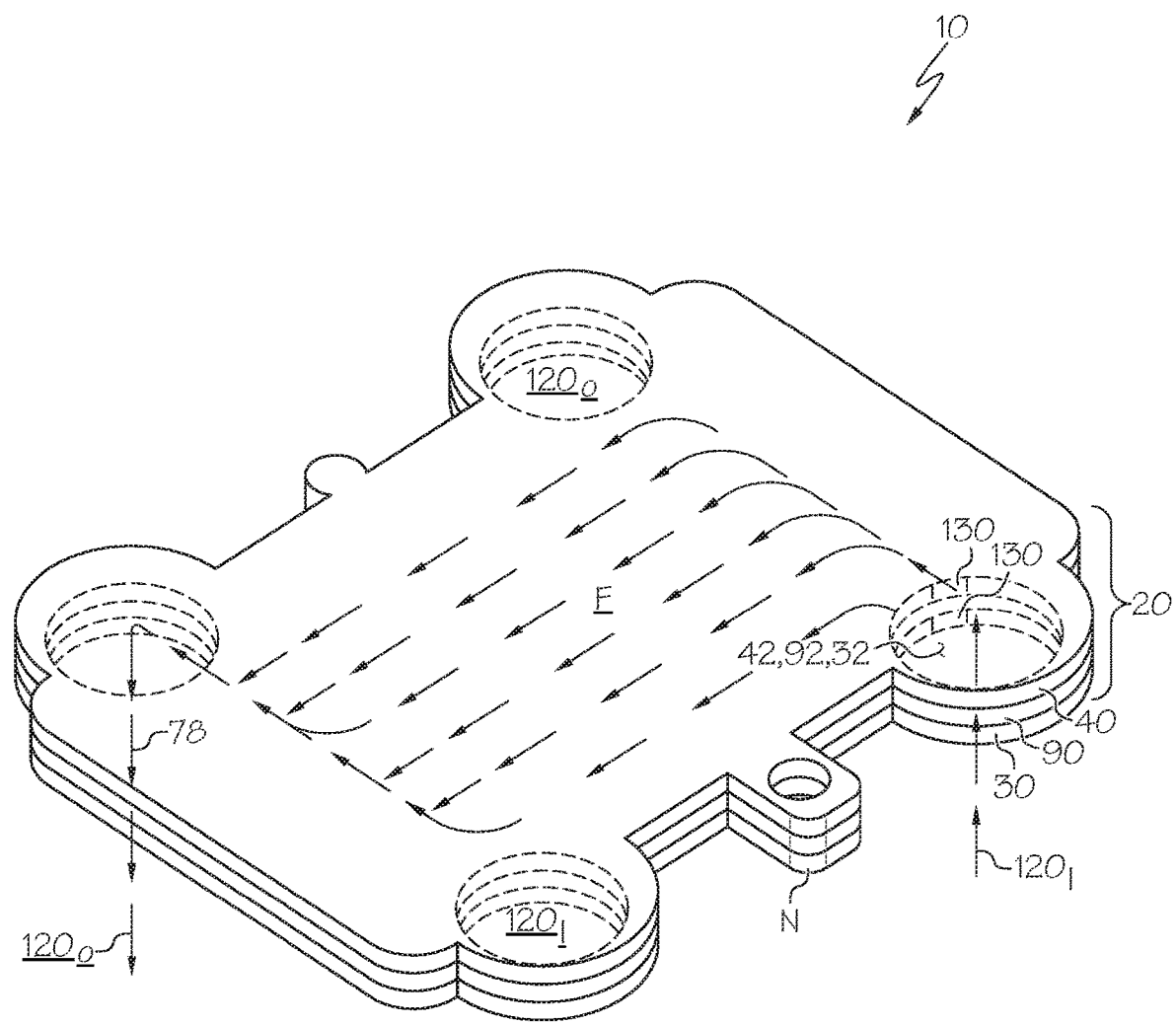
FIG. 5 is a perspective view of an uppermost portion of the SOFC stack of FIG. 1 depicting the distributed flow of one of the reactants through an upper end plate in accordance with one or more embodiments of the present disclosure.

Referring next to FIG. 5 in conjunction with FIGS. 4B and 4C, an elevated perspective view of an uppermost unit cell 20 of a portion of the SOFC stack 10 in an assembled state is shown, where the stack upper setter plate 50 of FIG. 1 is presently removed for clarity. In particular, the aligned placement of the upper separator plate 40 is stacked on top of the gasket 90 that in turn is stacked upon the intermediate separator plate 30. In one form, and assuming a vertically-upward movement of fuel being delivered to the various MEAs 70 of stack 10, the fuel flow F may traverse an inlet portion $120_I$ and corresponding outlet portion $120_O$ that are formed at opposite corners of the stack 10 by the various apertures 42, 92 and 32 of the respective upper end separator plate 40, gaskets 90 and intermediate separator plate 30. It will be appreciated that a comparable flow pattern takes place through the other two inlet and outlet portions $120_I$, $120_O$ that are formed in the opposing corners for the other reactant (air). The fuel flow F initially traverses upward along the stacking dimension through the passageway 120 and into its inlet portion $120_I$ and then through the various laterally-directed branched gates 130 that correspond to each of the respective intermediate separator plate 30 and upper end separator plate 40. The fuel flow F may then pass horizontally through the various vertical gaps $G_V$ as shown, where the size and shape of this reactant flow vertical gap $G_V$ helps promote the previously-discussed generally laminar flow. Lastly, the portion of the fuel flow F that has not diffused through the anode layer 72 and electrolyte layer 74 in order to react with air that has been conveyed in a similar manner to the cathode layer 76 traverses through the laterally-directed branched gates 130 at the opposite corner of the upper separator plate 40 and then downward along the stacking dimension through the outlet portion $120_O$.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure of the claimed subject matter and should be interpreted in like manner as the more commonly used open-ended preamble term "comprising."

What is claimed is:

1. A unit cell for a solid oxide fuel cell stack, the unit cell comprising a metal supported cell and at least one separator plate, wherein:
   the metal supported cell comprises a metal frame and a membrane electrode assembly;
   the metal frame comprises a pair of planar major surfaces that are separated from one another by an edgewise minor surface;
   the membrane electrode assembly comprises a planar cathode layer, a planar anode layer, and a planar electrolyte layer;
   the planar cathode layer is separated from the planar anode layer by the planar electrolyte layer such that the planar anode layer is situated on a first of the pair of planar major surfaces of the metal frame;
   the at least one separator plate of the unit cell comprises a peripheral lip that bounds a cavity such that a second of the pair of planar major surfaces of the metal frame is received within a volumetric region that is defined by the cavity and the peripheral lip to form a plurality of reactant passageways;
   the reactant passageways comprise an anode flowpath and a cathode flowpath;
   the anode flowpath is formed between a planar major surface of the at least one separator plate and the second of the pair of planar major surfaces of the metal frame to define a vertical gap between the planar major surface of the at least one separator plate and the second of the pair of planar major surfaces of the metal frame;

the cathode flowpath is fluidly cooperative with the planar cathode layer; and at least a portion of the metal frame is bonded to the peripheral lip to form (a) a seal to fluidly isolate the anode flowpath from the cathode flowpath and (b) a thermal barrier horizontal gap between the membrane electrode assembly and an upstanding wall of the at least one separator plate.

2. A solid oxide fuel cell stack comprising a plurality of unit cells, a stack upper setter plate and a stack lower setter plate, wherein:

the plurality of unit cells are aligned along a stacking dimension of the solid oxide fuel cell stack;

at least one of the plurality of unit cells comprises a metal supported cell and at least one separator plate;

the metal supported cell comprises a metal frame and a membrane electrode assembly;

the metal frame comprises a pair of planar major surfaces that are separated from one another by an edgewise minor surface;

the membrane electrode assembly comprises a planar cathode layer, a planar anode layer, and a planar electrolyte layer;

the planar cathode layer is separated from the planar anode layer by the planar electrolyte layer such that the planar anode layer is situated on a first of the pair of planar major surfaces of the metal frame;

the at least one separator plate of the unit cell comprises a peripheral lip that bounds a cavity such that a second of the pair of planar major surfaces of the metal frame is received within a volumetric region that is defined by the cavity and the peripheral lip to form a plurality of reactant passageways;

the reactant passageways comprise an anode flowpath and a cathode flowpath;

the anode flowpath is formed between a planar major surface of the at least one separator plate and the second of the pair of planar major surfaces of the metal frame to define a vertical gap between the planar major surface of the at least one separator plate and the second of the pair of planar major surfaces of the metal frame;

the cathode flowpath is fluidly cooperative with the planar cathode layer;

at least a portion of the metal frame is bonded to the peripheral lip to form (a) a seal to fluidly isolate the anode flowpath from the cathode flowpath and (b) a thermal barrier horizontal gap between the membrane electrode assembly and an upstanding wall of the at least one separator plate; and the stack lower setter plate is cooperative with the stack upper setter plate to exert a fixing pressure upon the plurality of unit cells along a stacking axis.

3. The solid oxide fuel cell stack of claim 2, wherein the membrane electrode assembly is spaced laterally inward from an exposed outer edge of the metal frame in a plane orthogonal to the stacking axis to define within the volumetric region the thermal barrier horizontal gap.

4. The solid oxide fuel cell stack of claim 3, wherein the uppermost part of the cathode layer forms the corresponding upper surface of the membrane electrode assembly.

5. The solid oxide fuel cell stack of claim 2, wherein the at least a portion of the metal frame that is bonded to the peripheral lip comprises a tab to form at least a part of a peripheral boundary region around the metal frame.

6. The solid oxide fuel cell stack of claim 2, wherein the fluid-tight seal comprises a weld.

7. The solid oxide fuel cell stack of claim 2, wherein the reactant flow vertical gap defines a thickness along the stacking axis of no more than one millimeter.

8. The solid oxide fuel cell stack of claim 2, wherein the fluid-tight seal defines a lateral width ratio of at least 0.5 relative to the thermal barrier horizontal gap.

9. The solid oxide fuel cell stack of claim 8, wherein the thermal barrier horizontal gap defines a lateral width of five millimeters and the fluid-tight seal defines a lateral width of four millimeters.

10. The solid oxide fuel cell stack of claim 2, wherein the plurality of fluidly separate reactant passageways are formed along the stacking dimension in the peripheral lip.

11. The solid oxide fuel cell stack of claim 2, further comprising a gasket disposed against and adjacently-facing surface of the at least one separator plate along the stacking dimension, wherein the gasket defines a plurality of apertures therein, the plurality of apertures comprising:

a first aperture with a surface area defining a size and shape that is substantially identical to a size and shape of the membrane electrode assembly along the stacking dimension; and a plurality of second apertures aligned with to the plurality of fluidly separate reactant passageways along the stacking dimension.

12. The solid oxide fuel cell stack of claim 2, wherein a coefficient of thermal expansion of the metal frame is substantially identical to a coefficient of thermal expansion of at least the portion of the peripheral lip that is bonded to the major surface of the metal frame.

13. The solid oxide fuel cell stack of claim 2, wherein the at least one separator plate comprises a plurality of separator plates comprising at least one of an intermediate separator plate and an end separator plate.

14. The solid oxide fuel cell stack of claim 2, further comprising a channel plate disposed within the volumetric region.

15. The solid oxide fuel cell stack of claim 14, wherein the channel plate and the metal frame comprise a porous structure.

16. The solid oxide fuel cell stack of claim 2, wherein the planar major surface of the metal frame comprises a porous structure.

* * * * *

UNITED STATES PATENT AND TRADEMARK OFFICE
CERTIFICATE OF CORRECTION

Page 1 of 1

PATENT NO. : 10,790,519 B2
APPLICATION NO. : 16/000171
DATED : September 29, 2020
INVENTOR(S) : Sai P. Katikaneni et al.

It is certified that error appears in the above-identified patent and that said Letters Patent is hereby corrected as shown below:

In the Specification

In Column 2, Line(s) 6, insert --The following detailed description of specific embodiments of the present disclosure can be best understood when read in conjunction with the following drawings, where like structure is indicated with like reference numerals and in which:--.

In Column 11, Line(s) 44, after "$G_H$", insert --.--.

In the Claims

In Column 14, Line(s) 36, Claim 11, delete "to".

Signed and Sealed this
Twenty-fourth Day of November, 2020

Andrei Iancu
*Director of the United States Patent and Trademark Office*